United States Patent [19]

Takebe et al.

[11] 3,919,436
[45] Nov. 11, 1975

[54] PROCESS FOR PREPARATION OF COATED MEDICINES

[75] Inventors: Toshio Takebe, Omiya; Tadashi Zenbutsu, Seda; Kinji Omata; Hiroya Mogi, both of Tokyo; Yoshitaka Taniguchi, Mitaka, all of Japan

[73] Assignee: Eisai Co., Ltd., Tokyo, Japan

[22] Filed: Sept. 25, 1972

[21] Appl. No.: 291,982

[30] Foreign Application Priority Data
Sept. 27, 1971  Japan .............................. 46-75182
Aug. 30, 1972  Japan .............................. 47-86847

[52] U.S. Cl. .................. 427/3; 424/33; 424/81
[51] Int. Cl.² ........................................ A61K 9/32
[58] Field of Search .. 117/100 A, 161 UN, 161 UC; 260/63 N, 63 UY; 424/33, 81; 427/3

[56] References Cited
UNITED STATES PATENTS

| | | | |
|---|---|---|---|
| 3,132,074 | 5/1964 | Svedres .................. | 117/100 A X |
| 3,277,056 | 10/1966 | Coleman .................. | 260/63 R |
| 3,379,554 | 4/1968 | Brindamour .............. | 117/100 A X |
| 3,383,236 | 5/1968 | Brindamour .............. | 117/100 A |
| 3,497,467 | 2/1970 | Coleman .................. | 260/80.73 X |
| 3,551,384 | 12/1970 | Zeh, Jr. .................. | 260/63 N |
| 3,592,945 | 7/1971 | Engelking ................ | 424/33 X |
| 3,710,796 | 1/1973 | Neefe ..................... | 128/260 |
| 3,775,537 | 11/1973 | Lehmann et al. .......... | 424/21 |

*Primary Examiner*—Michael Sofocleous
*Assistant Examiner*—Dennis C. Konopacki
*Attorney, Agent, or Firm*—Woodhams, Blanchard and Flynn

[57] ABSTRACT

A medicine-coating agent comprising a homopolymer or copolymer of a substituted acrylamide expressed by the following general formula is provided:

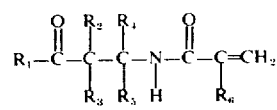

wherein $R_1$ to $R_6$ stand for a hydrogen atom or a lower alkyl group of 1 to 4 carbon atoms.

Particularly, a medicine-coating agent comprising a copolymer of (1) a substituted acrylamide expressed by the above general formula, with (2) an unsaturated carboxylic acid and (3) an unsaturated carboxylic acid ester of a polyalkyleneglycol lower alcohol ether is preferable.

9 Claims, No Drawings

PROCESS FOR PREPARATION OF COATED MEDICINES

BACKGROUND OF THE INVENTION

1. Field of the Invention

This invention relates to a novel coating agent for medicines and to a process for the preparation of coated medicines using such novel coating agents.

2. Description of the Prior Art

Various coating compositions have heretofore been proposed to protect medicines by coating them with natural high-molecular-weight substances or synthetic high-molecular-weight substances. However, these coating compositions are defective in some points or other and are still insufficient, and a satisfactory coating agent or composition has not been developed.

Many conventional coated medicines are defective in that the coating substances have a nasty or unpleasant smell or are readily colored, or they are readily decomposed upon contact with acidic medicines such as vitamin C. Further, many conventional coated medicines are insoluble in almost neutral liquids, though they are soluble in an artificial gastric juice of pH of 1.2 and an artificial intestinal juice of pH of 7.5. For this reason, it cannot be denied that in such conventional coated medicines the time required for disintegration of coatings is likely to be prolonged when the pH value is raised nearly to the neutral range in the stomach after eating. Also in the case of hypoacid patients, the time required for disintegration of coatings is prolonged. These are defects of conventional coated medicines.

Moreover, although as organic solvents for dissolving coating agents therein, there have generally been used dichloroethane, trichloroethylene, methylene chloride, benzol, methanol, ethanol, isopropyl alcohol, acetone, methanol-chloroform mixtures, etc., some of them are poisonous or irritating, and there is a danger that workers engaged in manufacture of coated medicines for a long time will sustain damages caused by such solvents, or harmful solvents left in coated medicines are administered and absorbed in the human body. Therefore, development of coating substances or agents which can be coated on medicines using harmless organic solvents have been demanded in the art.

SUMMARY OF THE INVENTION

As a result of our research works made with a view to providing coated medicines free of the above-mentioned defects and disadvantages, we have now found that when coated medicines are prepared by using as a coating agent a homopolymer or copolymer containing as an essential component a substituted acrylamide expressed by the following general formula

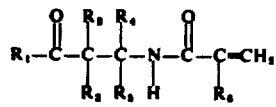

wherein $R_1$ to $R_6$ stand for a hydrogen atom or a lower alkyl group of 1 to 4 carbon atoms,
the intended objects can be attained.

A homopolymer or copolymer of this invention containing as an essential component a substituted acrylamide of the above general formula (which will be referred to as "coating substance of this invention" hereinbelow) does not undergo a chemical change in liquids of a broad pH range. Accordingly, unless the substance or medicine to be coated is highly acidic or alkaline, the surface of the resulting coating having a contact with the coated substance or medicine is chemically stable. Further, it is one of the excellent properties of the coating substance of this invention that it is colorless, tasteless and odorless.

Still further, tablets, granules or medicines of other form coated with the coating substance of this invention can be promptly absorbed because the coating substance of this invention is readily disintegrated in a digestive juice of any pH value.

A still further advantage of the coating substance of this invention is that it is soluble in various organic solvents, and especially it is soluble in ethyl alcohol and its solution exhibits an excellent film-forming property. Therefore, the coating substance of this invention can readily be coated with high operation safety.

It is therefore an object of this invention to provide a process for the preparation of coated medicines using a novel coating substance meeting all of the following desired requirements; in case the coating substance is coated directly on objective substances or medicines of a broad range, the contact surface of the coating does not undergo a chemical change caused by the coated substances or medicines; the coating substance is colorless, tasteless and odorless; medicines coated with this coating substance are readily disintegrated in any liquid and absorbed quickly; and the coating substance is soluble in ethyl alcohol.

None of the conventional coating compositions can meet all of the above desired requirements. The coating substance of this invention can fully meet such desired requirements and is advantageous in that it is soluble in ethyl alcohol. Therefore, the coating substance of this invention is very excellent and preferable.

Preferable examples of the substituted acrylamide which is the essential component of the coating substance of this invention are N-(1,1-dimethyl-3-oxobutyl)-acrylamide, N-(1-methyl-3-oxopropyl)-methacrylamide, N-(1,1-dimethyl-3-oxobutyl)-methacrylamide, etc. Of these substituted acrylamides, N-(1,1-dimethyl-3-oxobutyl)-acrylamide (which will be abbreviated as "diacetone acrylamide" hereinbelow) is most preferred.

As examples of monomers to be copolymerized with the substituted acrylamide, there may be mentioned lower alkyl ($C_1$-$C_4$) esters of acrylic acid, methacrylic acid, itaconic acid and maleic acid, acrylonitrile, styrene, substituted styrenes, vinyl acetate, vinyl chloride, vinyl ethers, hydroxyl group-containing unsaturated monomers such as 2-hydroxyethyl methacrylate and 2-hydroxypropyl methacrylate; amide monomers such as acrylamide and methacrylamide; carboxyl group-containing unsaturated monomers such as acrylic acid, methacrylic acid, itaconic acid, maleic acid and fumaric acid; and unsaturated carboxylic acid esters of polyalkyleneglycol lower alcohol ethers such as an acrylic acid ester of polyethyleneglycol butyl ether, an acrylic acid ester of polypropyleneglycol butyl ether, an acrylic acid ester of polyethyleneglycol ethyl ether, a methacrylic acid ester of polypropyleneglycol butyl ether, a methacrylic acid ester of polypropyleneglycol propyl ether, an acrylic acid ester of polyethylene-polypropyleneglycol butyl ether and a crotonic acid ester of polyethylene-polypropyleneglycol butyl ether.

These monomers may be copolymerized with the substituted acrylamide singly or in the form of admixtures of two or more of them.

Copolymers composed of two or more of substituted acrylamides expressed by the above general formula may also be used in this invention.

Of these copolymers, those composed of (1) a substituted acrylamide expressed by the above general formula, (2) a carboxyl group-containing unsaturated monomer such as acrylic acid, methylacrylic acid, itaconic acid, maleic acid and fumaric acid, and (3) an unsaturated carboxylic acid ester of a polyalkyleneglycol lower alcohol ether such as an acrylic acid ester of polyethyleneglycol butyl ether, an acrylic acid ester of polypropyleneglycol butyl ether, an acrylic acid ester of polyethyleneglycol ethyl ether, a methacrylic acid ester of polypropyleneglycol butyl ether, a methacrylic acid ester of polypropyleneglycol propyl ether, an acrylic acid ester of polyethylene-polypropyleneglycol butyl ether, and a crotonic acid ester of polyethylene-polypropylenelycol butyl ether, are novel compounds, and they are especially valuable as coating substances.

The copolymerization ratio of the above (1) substituted acrylamide, (2) carboxyl group-containing unsaturated monomer and (3) unsaturated carboxylic acid ester of a polyalkyleneglycol lower alcohol ether is preferably (1) : (2) : (3) = 30 – 70 : 10 – 40 : 10 – 30% by weight, more preferably about 60 : about 20 : about 20% by weight.

In general, when medicines or the like are coated with coating agents or compositions, the drying is effected with use of air heated to 40° to 70°C. Accordingly, it is necessary that components of such copolymer should be so selected that blocking is not caused to occur at such drying temperature.

In case the coating substance of the copolymer type is used for coating of medicines, it is generally preferred that the amount of the substituted acrylamide is more than 10 mole%. When the content of the substituted acrylamide is less than 10 mole %, the resulting coated medicines tend to exhibit undesired reduction of disintegration in digestive juices of human body.

Homopolymers and copolymers to be used in this invention may be prepared by any known conventional polymerization methods such as solution polymerization method, emulsion polymerization method and bulk polymerization method.

In this invention, the solution polymerization technique is mainly adopted. As the organic solvent to be used in the solution polymerization, there may be exemplified methanol, ethanol, n-propanol, isopropanol, n-butanol, sec-butanol, tert-butanol, diacetone alcohol, glycol ethers, e.g., ethyleneglycol monomethyl ether and ethyleneglycol monoethyl ether, acetone, methylketone, ethyl acetate, benzene and trichloroethylene.

In view of the safety of the solvent to be contained in a medicine, use of solvents of the alcohol type is preferred, and of the alcoholic solvents, ethyl alcohol is most preferred.

These solvents may be used singly, or mixtures of two or more of such solvents may also be used.

As the polymerization initiator, there may be employed known radical initiators such as azobisisobutyronitrile, lauroyl peroxide, benzoyl peroxide, hydrogen peroxide and potassium persulfate.

Homopolymers, copolymers or mixtures thereof prepared by the solution polymerization method or other polymerization method may be used directly in the form of as-prepared solutions in such organic solvents as bases of coating compositions. In some cases, they are once separated from water-soluble impurities, for instance, by pouring the as-prepared solution of the polymer in the organic solvent into water, and then, they are dried, dehydrated, dissolved in an organic solvent again and used in the solution form as bases of coating compositions.

In this case, the organic solvent to be contained in the coating composition to be used for coating a medicine or the like need not be identical with the organic solvent used in the polymerization.

Various solvents may be used for forming compositions for coating medicines of the table or granule type, but in view of the safety ethyl alcohol is most preferred as such solvent.

When the coating substance of this invention is formed into a composition for use in coating tablets or the like, an organic medium solution of the main ingredient, i.e., the substituted acrylamide homopolymer or copolymer of this invention may further comprise known additives such as surfactants, dispersing agents, plasticizers, hiding agents, coloring substances, perfumes, waxes and silicones.

Tablets, pills and the like coated according to this invention have the following merits and advantages.

1. The active ingredient medicine is shut off from such outside influences as humidity, oxygen, light and microorganisms, and therefore, degradation of its quality can be prevented.
2. When they are administered, they are promptly disintegrated in gastric juice. More specifically, they are characterized in that their disintegration is extremely high regardless of the hydrogen ion concentration in a digestive juice.
3. Whether the substance to be coated is acidic or akaline, the coating substance of this invention is stable and does not undergo a chemical change even if it has a contact with a central tablet.
4. Although in conventional coated tablets or the like a sugarcoating layer or other coating layer should be further coated on the layer of the coating agent in order to give a good appearance or feeling, in the tablets or the like coated according to this invention the layer of the coating substance exhibits a beautiful appearance and a lustrous smooth surface, and the coated tablets need not be further coated with a sugar coating layer or the like. Further, the coating substance of this invention is colorless, tasteless and odorless.
5. The coating substance of this invention is soluble in various organic solvents. Especially, it is soluble in ethyl alcohol. Therefore, workers do not sustain any harmful influences even when they are engaged in preparing coated medicines for a long time. Moreover, even if the solvent (ethyl alcohol) is left in the coating, it does not give any harm.

The preparation of the coating substance of this invention will now be illustrated by reference to Referential Examples.

REFERENTIAL EXAMPLE 1

A 4-neck flask of a 1-liter capacity equipped with a thermometer, a stirring rod and a condenser was charged with 200 g of diacetone acrylamide and 200 g of ethanol, and the temperature was raised to the reflux temperature under agitation in a nitrogen current.

After the temperature reached the reflux temperature, the charge of the flask was maintained at the reflux temperature for 10 minutes. Then, 80 g of an ethanol solution containing 2.5% of hydrogen peroxide and 120 g of an ethanol liquor containing 5% of tartaric acid were added dropwise from different inlets to the charge of the flask over a period of 1 hour under reflux. The reaction mixture was further heated under reflux while stirring for 5 hours to obtain a colorless, transparent homopolymer solution having a non-volatile content of 37.2% and a viscosity of 380 cps (as measured at 20°C.).

REFERENTIAL EXAMPLE 2

A 4-neck flask of a 1-liter capacity equipped with a thermometer, a stirring rod and a condenser was charged with 140 g of ethanol, and it was heated under agitation and maintained under reflux for 10 minutes. Then, a mixture of 100 g of diacetone acrylamide, and 100 g of methyl methacrylate in 100 g of ethanol (diacetone acrylamide = about 37.1 mole %), 40 g of an ethanol solution containing 5% of hydrogen peroxide and 120 g of an ethanol liquor containing 5% of tartaric acid were successively added dropwise over a period of 2 hours under reflux from different inlets, and the reaction mixture was further heated under reflux for 5 hours while stirring to obtain a colorless, transparent copolymer solution having a non-volatile content of 32.9% and a viscosity of 450 cps (as measured at 20°C.).

REFERENTIAL EXAMPLE 3

In substantially the same manner as in Referential Example 2, a diacetone acrylamide-vinyl acetate copolymer was prepared (diacetone acrylamide = 33.7 mole %).

REFERENTIAL EXAMPLE 4

In substantially the same manner as in Referential Example 2, a diacetone acrylamide-styrene copolymer was prepared (diacetone acrylamide = 38 mole %).

REFERENTIAL EXAMPLE 5

In the same manner as in preceding Referential Examples, a diacetone acrylamide-methyl methacrylate copolymer was prepared (diacetone acrylamide = 15 mole %).

REFERENTIAL EXAMPLE 6

In the same manner as in preceding Referential Examples, a diacetone acrylamide-methyl acrylate copolymer was prepared (diacetone acrylamide = 55 mole %).

REFERENTIAL EXAMPLE 7

A 4-neck flask of a 1-liter capacity equipped with a thermometer, a stirring rod and a condenser was charged with 105 g of diacetone acrylamide, 380 g of ethanol, 63 g of acrylic acid and 42 g of an acrylic acid ester of polyethyleneglycol butyl ether, and the mixture was heated to the reflux temperature under agitation in a nitrogen current. After the temperature reached the reflux temperature, the mixture was maintained at the reflux temperature for 10 minutes, and then, an ethanol solution containing 2.5% (7.5 g) of hydrogen peroxide and an ethanol liquor containing 5% (1.6 g) of tartaric acid were successively added dropwise to the mixture from different inlets over a period of 1 hour. The reaction mixture was further heated under reflux for 5 hours while stirring to obtain a colorless, transparent copolymer solution having a non-volatile content of 35% and a viscosity of 800 cps (20°C).

REFERENTIAL EXAMPLE 8

In substantially the same manner as in Referential Example 7, a copolymer solution having a non-volatile content of 36% and a viscosity of 1600 cps (20°C) was prepared from 116 g of diacetone acrylamide, 73 g of acrylic acid and 21 g of a acrylic ester of polypropyleneglycol butyl ether.

REFERENTIAL EXAMPLE 9

In substantially the same manner as in preceding Referential Examples, a copolymer solution having a non-volatile content of 35% and a viscosity of 750 cps (20°C) was prepared from 126 g of diacetone acrylamide, 53 g of methacryclic acid and 31 g of an acrylic acid ester of polyethyleneglycol ethyl ether.

REFERENTIAL EXAMPLE 10

In substantially the same manner as in preceding Referential Examples, a copolymer solution having a non-volatile content of 37% and a viscosity of 1550 cps (20°C) was prepared from 137 g of diacetone acrylamide, 42 g of methacrylic acid and 31 g of a methacrylic acid ester of polypropyleneglycol butyl ether.

REFERENTIAL EXAMPLE 11

In substantially the same manner as in preceding Referential Examples, a copolymer solution have a nonvolatile content of 35% and a viscosity of 850 cps (20°C) was prepared from 126 g of diacetone acrylamide, 53 g of acrylic acid and 31 g of an acrylic acid ester of polyethyleneglycol ethyl ether.

REFERENTIAL EXAMPLE 12

In substantially the same manner as in preceding Referential Examples, a copolymer solution having a non-volatile content of 35% and a viscosity of 1200 cps (20°C) was prepared from 105 g of diacetone acrylamide, 63 g of acrylic acid, and 42 g of an acrylic acid ester of polyethylene-polypropyleneglycol butyl ether.

This invention will now be illustrated in more details by reference to Examples, but these Examples are given for illustration only and the scope of this invention is not limited by these Examples.

EXAMPLE 1

The following ingredients were mixed and dispersed by a homo-mixer to obtain a homogeneous suspension. The suspension was spray-coated according to a customary method on 5 kg of tablets, each having a weight of 150 mg and a diameter of 7 mm.

| | |
|---|---|
| Ethyl alcohol solution of diacetone acrylamide homopolymer (non-volatile content = 37.2%; viscosity = 380 cps) | 300 g |
| Diethyl phthalate | 12 g |
| Polyoxyethylene oleyl ether | 0.3 g |
| Titanium oxide | 2 g |
| Ethyl alcohol | 1,200 g |

When the resulting coated tablets were put into an artificial gastric juice (pH = 1.2), they were disintegrated within 2 minutes. When they were put into a buffer solution of phosphoric acid (pH = 5.7) likened to a gastric juice of a hypoacid patient, they were also disintegrated within 2 minutes.

The above suspension was coated on a release paper by means of an applicator so that the dried film would have a thickness of 40μ, and the coated suspension was dried at 70°C. for 20 minutes. The aging resistance of the resulting coating was tested under the following conditions:

1. The coating was allowed to stand still in a thermostat drier maintained at 50°C for 2 months.
2. The coating was allowed to stand still in a room maintained at room temperature (on the north side) for 2 months.
3. The coating was exposed to rays emitted from a sterilizing lamp (15W; GL 15 type manufactured by Mitsubishi Electrics) disposed 25 cm apart from the coating for 100 hours.

In each test, the appearance of the coating was not damaged, and as a result of the infrared absorption spectrum analysis it was confirmed that no change was brought about.

EXAMPLE 2

The following ingredients were mixed and dispersed by means of a homo-mixer to obtain a homogeneous suspension, and the suspension was spray coated according to a customary method on 5 kg of tablets, each having a weight of 200 mg and a diameter of 8 mm.

| | |
|---|---|
| Ethyl alcohol solution of diacetone acrylamide (about 37.1 mole %)/methyl methacrylate copolymer (non-volatile content = 39.9%; viscosity = 450 cps) | 300 g |
| Dibutyl phthalate | 15 g |
| Titanium oxide | 5 g |
| Talc | 10 g |
| Soft silicic anhydride (Aerosil) | 3 g |
| Polyoxyethylene oleyl ether | 0.6 g |
| Tartrazine aluminum lake | 2 g |
| Ethyl alcohol | 1,600 g |

The resulting coated tablets were disintegrated within 4 minutes in an artificial gastric juice (pH = 1.2) and within 5 minutes in a buffer solution of phosphoric acid (pH = 7.5) likened to an artificial intestinal juice.

When the aging tests were conducted under the same conditions as in Example 1, the coating appearance was not damaged and as a result of the infrared absorption spectrum analysis it was confirmed that no change was brought about.

EXAMPLE 3

The following ingredients were mixed to form a solution, and it was coated according to a customary air suspension coating method on 3 kg of bitter pills, each pill containing 200 mg of homochlorcyclizine per gram of the pill and having a diameter of about 1 mm.

| | |
|---|---|
| Ethyl alcohol solution of diacetone acrylamide (about 33.7 mole %)/vinyl acetate copolymer (non-volatile content = 33%; viscosity = 350 cps) | 300 g |
| Dibutyl phthalate | 11.5 g |
| Silicone | 0.4 g |
| Vanillin | 0.1 g |
| Ethyl alcohol | 800 g |

When the resulting coated pills were orally administered, a bitter taste was not given to tongue. The coated pills were disintegrated within 6 minutes in an artificial gastric juice (pH = 1.2) and within 7 minutes in a buffer solution of phosphoric acid (pH = 7.5) likened to an artificial intestinal juice.

When the aging tests were conducted in the same manner as in Example 1 with use of the above coating composition, satisfactory and good results were obtained.

EXAMPLE 4

The following ingredients were mixed to form a solution.

| | |
|---|---|
| Ethyl alcohol solution of N-(1-methyl-3-oxopropyl)-methacrylamide homopolymer (non-volatile content = 32%; viscosity = 460 cps) | 20 g |
| Triacetin | 0.1 g |
| Ethyl alcohol | 180 g |

The solution was sprayed little by little several times repeatedly according to a customary method on 5 kg of coated tablets obtained by the method of Example 1 or 2, which were being rotated in a calender having a canvas inner lining. The resulting coated tablets exhibited a beautiful gloss, but their disintegrating property was not influenced at all.

When the above composition was subjected to the aging tests in the same manner as in Example 1, satisfactory and good results were obtained.

EXAMPLE 5

The following ingredients were mixed and dispersed by means of a homo-mixer to obtain a homogeneous suspension, and it was spray-coated according to a customary method on 6 kg of tablets, each having a weight of 400 mg and a diameter of 11 mm.

| | |
|---|---|
| Ethyl alcohol solution of copolymer of diacetone acrylamide, acrylic acid and acrylic acid ester of polypropyleneglycol butyl ether (solid content = 35%; viscosity = 1600 cps) | 1,170 g |
| Titanium oxide | 30 g |
| Stearyl alcohol | 80 g |
| Sorbitan mono-oleate | 45 g |
| Tartrazine aluminum lake | 5 g |
| Silicone | 0.3 g |
| Ethyl alcohol | 3,500 g |

The resulting coated tablets were disintegrated within about 4 minutes in an artificial gastric juice (pH = 1.2) and within about 3 minutes in an artificial intestinal juice (pH = 7.5).

EXAMPLE 6

The following ingredients were mixed and dispersed by means of a homo-mixer to form a homogeneous suspension, and it was coated on 4 kg of pills of a diameter of 0.7 mm according to a customary air suspension coating method.

| | |
|---|---|
| Ethyl alcohol solution of copolymer of diacetone acrylamide, methacrylic acid and acrylic acid ester of polyethylene-polypropyleneglycol butyl ether (solid content = 35%; viscosity = 1200 cps) | 1,170 g |
| Titanium oxide | 50 g |
| Cetyl alcohol | 35 g |
| Sorbitan monostearate | 50 g |

-continued

| | |
|---|---|
| Tartrazine aluminum lake | 4 g |
| Silicone | 0.2 g |
| Ethyl alcohol | 3,000 g |

The resulting coated pills were disintegrated within about 8 minutes in an artificial gastric juice (pH = 1.5) and within about 7 minutes in an artificial intestinal juice (pH = 7.5).

The embodiments of the invention in which an exclusive property or privilege is claimed are defined as follows:

1. A process for forming film coatings on the surfaces of a plurality of solid, shaped, pharmaceutical medicated tablets or granules, which comprises the steps of: spraying onto said tablets or granules a liquid coating composition made up of a coating agent dissolved in a volatile organic solvent to form a surface film coating on said tablets or granules, said coating agent consisting essentially of a polymer selected from the group consisting of
    a. homopolymer of a monomer of the formula

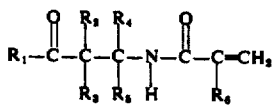

wherein $R_1$ to $R_6$ is H or alkyl having 1 to 6 carbon atoms;
    b. polymers consisting of at least two monomers of said formula;
    c. polymers consisting of more than 10 mole percent of at least one monomer of said formula and the balance being at least one comonomer selected from the group consisting of alkyl ($C_1$–$C_4$) esters of acrylic acid, methacrylic acid, itaconic acid or maleic acid, acrylonitrile, styrene, substituted styrenes, vinyl acetate, vinyl chloride, vinyl ethers, 2-hydroxyethyl methacrylate, 2-hydroxypropyl methacrylate, acrylamide, methacrylamide, acrylic acid, methacrylic acid, itaconic acid, maleic acid, fumaric acid, acrylic acid ester of polyethyleneglycol butyl ether, acrylic acid ester of polypropyleneglycol butyl ether, acrylic acid ester of polyethyleneglycol ethyl ether, methacrylic acid ester of polypropyleneglycol butyl ether, methacrylic acid ester of polypropyleneglycol propyl ether, acrylic acid ester of polyethylene-polypropyleneglycol butyl ether and crotonic acid ester of polyethylene-polypropyleneglycol butyl ether, and drying the thus-coated tablets or granules.

2. The process for the preparation of coated medicines as claimed in claim 1 in which said organic solvent is ethyl alcohol.

3. A process according to claim 1, in which said polymer consists of a copolymer of (1) diacetone acrylamide, (2) at least one carboxyl-containing unsaturated monomer selected from the group consisting of acrylic acid, methacrylic acid, itaconic acid, maleic acid and fumaric acid, and (3) at least one unsaturated carboxylic acid ester of polyalkyleneglycol lower alcohol ether selected from the group consisting of acrylic acid ester of polyethyleneglycol butyl ether, acrylic acid ester of polypropyleneglycol butyl ether, acrylic acid ester of polyethyleneglycol ethyl ether, methacrylic acid ester of polypropyleneglycol butyl ether, methacrylic acid ester of polypropyleneglycol propyl ether, acrylic acid ester of polyethylene-polypropyleneglycol butyl ether, and crotonic acid ester of polyethylene-polypropyleneglycol butyl ether.

4. A process according to claim 2, in which the copolymerization ratio of (1) : (2) : (3) is 30 to 70: 10 to 40: 10 to 30% by weight.

5. A process according to claim 1, in which said coating agent consists of (c).

6. A process according to claim 5, in which said coating agent contains from 30 to 70% by weight of monomer of said formula.

7. A process according to claim 1, in which said coating agent consists of a copolymer consisting of (1) at least one monomer of said formula and (2) at least one comonomer selected from the group consisting of acrylic acid, methacrylic acid, itaconic acid, maleic acid, fumaric acid and alkyl ($C_1$–$C_4$) ester of acrylic acid, methacrylic acid, itaconic acid or maleic acid.

8. A process according to claim 1, in which said monomer of said formula consists of N-(1,1-dimethyl-3-oxobutyl)-acrylamide.

9. A process according to claim 1, in which said coating agent consists of a copolymer of N-(1,1-dimethyl-3-oxobutyl)-acrylamide and methyl methacrylate.

* * * * *